Sept. 16, 1924.

F. MYERS

PNEUMATIC TIRE VALVE

Filed Nov. 11, 1922

1,508,984

Inventor
Frederick Myers

Attorney

Patented Sept. 16, 1924.

1,508,984

UNITED STATES PATENT OFFICE.

FREDERICK MYERS, OF NEW YORK, N. Y.

PNEUMATIC-TIRE VALVE.

Application filed November 11, 1922. Serial No. 600,279.

*To all whom it may concern:*

Be it known that I, FREDERICK MYERS, a citizen of the United States of America, residing at New York, in the county of New York and State of New York, have invented certain new and useful Improvements in Pneumatic-Tire Valves, of which the following is a specification.

This invention relates to certain new and useful improvements in valves, and has particular reference to that type of valve for use in connection with the pneumatic inner tube of an automobile or other tire wherein the valve is spring pressed to its seat when an air pump or other inflating device is disengaged therefrom.

The primary object of the invention resides in the provision of a pneumatic tire valve that is spring pressed and automatically maintaind in a closed position with means associated with the outer end of the valve stem for holding the valve in a locked position on its seat.

A further object of the invention is to provide a valve for pneumatic tires wherein a valve structure that is bodily mounted into the casing stem of an inner tube, incloses a valve stem and a locking sleeve or collar, the stem cooperating with the locking collar for either holding the valve at the inner or lower end thereof in a closed and locked position upon its seat, or, with the valve retained in a position spaced from its seat to permit deflation of an inner tube without the necessity of holding the valve stem pressed inwardly by the hand of the operator.

A still further object of the invention is to provide a valve structure of the type above set forth wherein the closure valve associated with the inner end of the spring pressed valve stem is slidably mounted upon said valve stem and independently spring pressed for assisting the mainspring on the valve stem for seating the same, a cup-shaped member fixed to the inner end of the valve stem enclosing the valve and auxiliary spring.

This application is a continuation in part, insofar as shown and described in application filed by me on May 11, 1922, Serial No. 560,082, and application filed August 14, 1922, Serial No. 581,704, and embodies improvements thereover as hereinafter set forth.

With the above and other objects in view as the nature of the invention is better understood, the same consists of the novel form, combination and arrangement of parts hereinafter more fully described, shown in the accompanying drawing and claimed.

Figure 1:
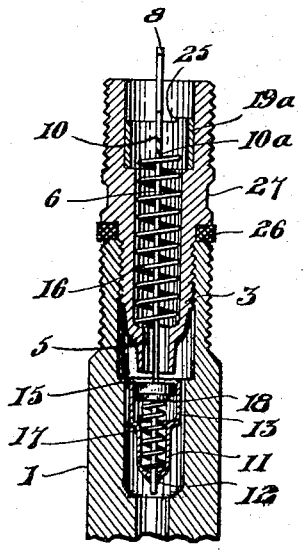
Figure 2:
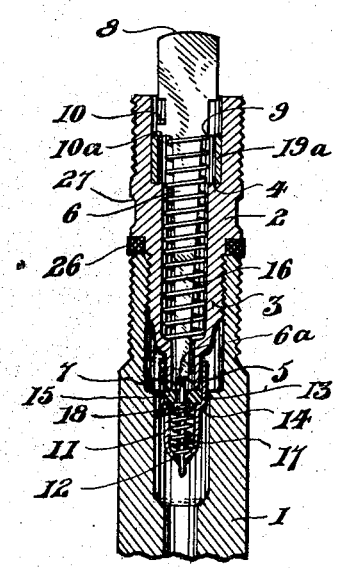
Figure 5:
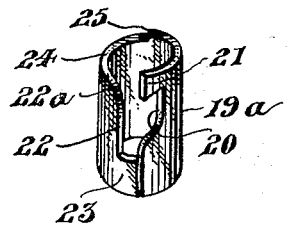
Figure 4:
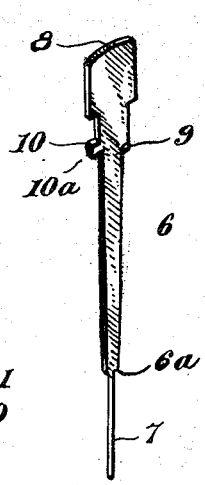
Figure 3:
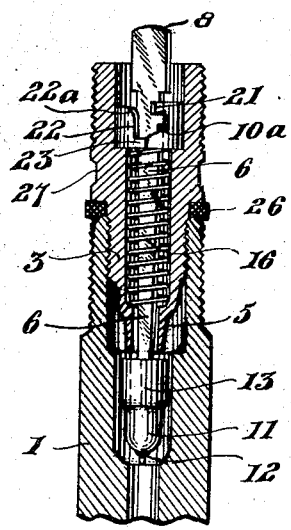
Figure 6:
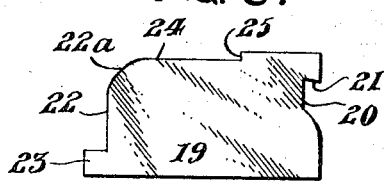

In the drawing, wherein like reference characters designate corresponding parts throughout the several views, Figure 1 is a vertical sectional view of a pneumatic tire valve constructed in accordance with the present invention, the stem casing for the inner tube being broken away with the spring pressed valve stem shifted to an open position, showing the main spring associated with the valve stem and the auxiliary spring associated with the inner end of the valve stem and directly engaging the valve, Figure 2 is a vertical sectional view similar to Fig. 1 showing the valve in its closed and locked position, Figure 3 is a longitudinal sectional view showing the valve locked in an open position, Figure 4 is a perspective view of the valve stem removed from the casing, Figure 5 is a perspective view of the locking collar associated with the valve stem and removed from the casing, and Figure 6 is a developed plan view of the blank from which the locking collar is formed.

Briefly described, the present invention aims to provide a valve structure for the inner tubes of pneumatic tires wherein the stem carrying the valve may be locked in two positions, one position holding the valve locked or retained on its seat, and the other position holding the valve spaced from its seat to permit continuous deflation of an inner tube, a locking collar positioned in the tubular member of the valve structure cooperating with the valve stem to accomplish these results. The valve stem has a main coil spring associated therewith for normally forcing the same to its limit of outward movement, while the valve for closing the air passage through the valve structure is slidably mounted upon the inner end of the valve stem and is independently spring pressed to be more firmly held against its seat, a cup-shaped member secured to the inner end of the valve stem inclosing the auxiliary spring and the valve on the stem.

Referring more in detail to the accompanying drawing, there is illustrated a pneumatic tire valve wherein the reference numeral 1 indicates the outer end of a casing stem for a tire tube, the outer or upper end of the casing stem 1 being internally and externally threaded as illustrated.

The valve structure associated with the upper end of casing stem 1 includes a tubular member 2 having a reduced externally threaded portion 3 for engagement with the internal threads upon the upper end of the casing stem 1, the upper end of the tubular member 2 being chamfered to provide an annular shoulder 4 and being externally threaded for the reception of the usual screwcap to close the outer end thereof. A depending nipple 5 is carried by the lower end of the reduced portion 3 of the tubular casing 2, having an opening therein for the passage of the valve stem with the lower end thereof constituting the valve seat as will hereinafter appear.

A tapering valve stem 6 of the form best illustrated in Fig. 4 is slidably mounted in the tubular member 2, the same carrying upon the lower end thereof a pin extension 7 while the upper end is provided with a gripping head 8, the valve stem 6 below the head 8 and adjacent thereto being provided upon one side thereof with a shoulder 9 while the opposite side of said stem in line with the shoulder 9 carries an outwardly directed lug 10 having the lower edge thereof beveled as at 10$^a$ for purposes presently to appear.

The valve stem 6 positioned in the tubular member 2 has the lower pin extension 7 carried thereby projecting through the nipple 5 formed at the lower end of the tubular member with a cup-shaped casing 11 secured to the free end of the extension pin 7, said pin passing through an aperture in the bottom wall of the cup-shaped casing 11 as shown in Figs. 1 to 3, and so anchored, as by soldering 12 or otherwise. The upper end of the cup-shaped casing 11 is enlarged as at 13 defining an annular shoulder 14 while a cushion disk valve 15 slidably mounted upon the upper end of the extension pin 7 adjacent the lower end of the valve stem 6 is at all times disposed within the upper enlarged end 13 of the cup-shaped casing 11. A main coil spring 16 surrounds the valve stem 6, the lower end thereof engaging the lower end of the reduced portion 3 of the tubular member 2 above the nipple 5 as illustrated, while the upper end of the coil spring engages the shoulder 9 and lug 10 for normally forcing the valve stem at its limit of upward or outward movement relative to the valve mechanism casing 2. An auxiliary spring 17 is enclosed by the cup-shaped casing 11, the same surrounding the pin extension 7 of the valve stem 6, engaging at its lower end the bottom wall of the cup-shaped casing while a washer 18 is slidably mounted upon the extension pin 7 and is interposed between the cushion valve 15 and the upper end of the auxiliary spring 17 as clearly shown in Figs. 1 and 2.

A locking collar is associated with the upper end of the tubular member 2 and the valve stem 6, the same being shown more clearly in Figs. 5 and 6 as being formed from a blank 19 bent into cylindrical formation as at 19$^a$ in Fig. 5, the blank being substantially of rectangular form in plan view as illustrated in Fig. 6 with one edge thereof notched as at 20 to provide a shoulder 21, the opposite side edge being cutaway as at 22 to provide a laterally extending lug 23, the upper edge of the cutaway portion 22 being rounded as at 22$^a$ while the upper edge of the blank 19 is further cutaway as at 24 defining a shoulder 25. When the blank is bent into tubular formation, the same assumes the position illustrated in Fig. 5 and is positioned in the chamfered upper end of the tubular member 2 with the lower plain edge thereof resting upon the shoulder 4 of the tubular member. When the blank 19 is completed, as shown in Fig. 5, the outer edge of the lug 23 at the bottom edge of the blank engages the opposite end wall thereof to provide a vertical slot in the locking collar with the vertical edge wall of the shoulder 21 spaced from the adjacent edge of the cutaway portion 22 as illustrated.

With the valve stem 6 in its normal position, the main coil spring 16 surrounding the valve stem and engaging the lower end of the tubular member 2 and the shoulder and lug upon the valve stem at opposite ends thereof normally holds the valve stem at its limit of upward movement by spring tension thereon, the cushion disk valve 15 slidably mounted upon the lower pin extension 7 of the valve stem engaging the lower edge of the nipple 5 for sealing the air passage through the valve mechanism member, the auxiliary spring 17 engaging the bottom wall of the cup-shaped casing 11 and the sliding washer 18 on the pin 7 beneath the disk valve 15, forcing the latter into intimate contact with the open end of the nipple 5. The auxiliary spring 17 effectively seals the opening through the nipple 5 and prevents the passage of air therethrough, the valve piston further engaging the shoulder 14 upon the cup-shaped casing 11 to prevent air entering the casing and passing between the valve 15 and stem pin 7. When it is desired to positively lock the valve 15 to its seat on the nipple 5, it being understood that the shoulder 9 upon the valve stem 6 escapes the adjacent edge wall of the locking collar 19, with the lug 10 vertically slidable in the space or slot adjacent the cutaway portion 22 of the locking collar, the upper end or head 8 of the valve stem is gripped for rotating the valve stem to move the lower beveled edge 10ª of the lug 10 over the rounded corner 22ª of the locking collar to position the lug upon the upper cutaway edge 24 of the locking collar, rotary movement of the valve stem being limited by the lug 10 engaging the shoulder 25. During this movement, the auxiliary spring 17 is further compressed for forcing the disk valve 15 into intimate and positive engagement with the lower open end of the nipple 5 while the upper enlarged end 13 of the cup-shaped casing 12 moves upwardly to inclose the nipple as illustrated in Fig. 2. In deflating an inner tube, the valve stem 6 having the lug 10 thereof positioned in the slot formed by the cutaway end wall 22 of the locking collar is rotated in the opposite direction to position the lug 10 beneath the shoulder 21, the positioning of the lug 10 beneath the shoulder 21 being effected by depressing the valve stem as shown in Fig. 3 with the valve stem so retained, the shoulder 6ª at the point of connection between the lower end of the valve stem 6 and the pin extension 7 engaging the disk valve 15 to positively space the same from the lower end of the nipple 5. With the valve 15 lowered as illustrated in Figs. 1 and 3, the spring 16 is compressed and under tension and tension on the spring 17 is relieved. When pressure on the outer end of the stem 6 is removed, the spring 16 will move the valve stem upwardly in the tubular member 2 and immediately start compression of the spring 17 at the time when the shoulder 6ª on the valve stem is spaced from the valve and the latter engaging the seat at the lower end of the nipple 5. The spring 16 continues to shift the stem 6 and compress the spring 17 until the force thereof is substantially equalized by the compression of spring 17, the valve 15 being loose on the stem 6 and engaged by the spring 17 being pressed into intimate contact with its seat and slight movement of the valve stem will have no effect upon the valve 15 as the same is retained in engagement with its seat by the spring 17. The spring 16 possessing greater strength than the spring 17 will compress the spring 17 until pressures are practically equalized to insure proper tension on the valve 15 and constant seating thereof.

From the above detail description of the invention, it is believed that the construction and operation thereof will at once be apparent, it being noted that the valve stem 6 may be positioned in the tubular member 2 in a manner to permit the usual operation thereof, rotation of the valve stem in one direction causing an elevation thereof with the valve being locked to its seat through the medium of cooperating devices carried by the valve stem and the tubular member enclosing the same, while the valve may be also locked in an open position upon rotation thereof in the opposite direction. As shown in Figs. 1 to 3, a sealing gasket 26 is interposed between the upper end of the casing stem 1 and the tubular member 2, while a wrench engaging surface 27 is formed on the tubular member 2 to facilitate positioning thereof. The upper end of the tubular member 2 receives the usual threaded closure cap, while a dust cap of any approved design may be mounted upon the casing stem 1.

While there is herein shown and described the preferred embodiment of the present invention, it is nevertheless to be understood that minor changes may be made therein without departing from the spirit and scope of the invention as claimed.

What is claimed as new is:—

1. In a pneumatic tire valve, a tensioned one-piece valve stem, and a spring supported valve slidably carried by the stem.

2. In a pneumatic tire valve, a tensioned one-piece valve stem, a spring supported valve slidably carried by the stem, and a casing for the valve.

3. In a pneumatic tire valve, a tensioned one-piece valve stem, a spring supported valve slidably carried by the stem, and a casing for the valve fixed to the lower end of the valve stem.

4. In a pneumatic tire valve, a tensioned valve stem, a spring supported valve carried by the stem, and means cooperating with the valve stem for selectively holding the valve locked on or spaced from its seat.

5. In a pneumatic tire valve, a tensioned one-piece valve stem, a spring supported valve slidably carried by the stem, a casing for the valve, and means cooperating with the valve stem for selectively holding the valve locked on or spaced from its seat.

6. In a pneumatic tire valve, a tensioned one-piece valve stem, a spring supported valve slidably carried by the stem, a casing for the valve fixed to the lower end of the valve stem, and means cooperating with the valve stem for selectively holding the valve locked on or spaced from its seat.

7. In a pneumatic tire valve, a tensioned valve stem, a spring supported valve carried by the stem, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

8. In a pneumatic tire valve, a tubular member adapted for mounting in a casing stem, a valve seat at the lower end of the tubular member, a tensioned valve stem slidably mounted in the tubular member, a valve carried by the stem for closing on the valve seat, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

9. In a pneumatic tire valve, a tensioned valve stem, a spring supported valve carried by the stem, a casing for the valve, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

10. In a pneumatic tire valve, a tubular member adapted for mounting in a casing stem, a valve seat at the lower end of the tubular member, a tensioned valve stem slidably mounted in the tubular member, a valve carried by the stem for closing on the valve seat, a casing for the valve, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

11. In a pneumatic tire valve, a tensioned valve stem, a spring supported valve carried by the stem, a casing for the valve fixed to the lower end of the valve stem, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

12. In a pneumatic tire valve, a tubular member adapted for mounting in a casing stem, a valve seat at the lower end of the tubular member, a tensioned valve stem slidably mounted in the tubular member, a valve carried by the stem for closing on the valve seat, a casing for the valve fixed to the lower end of the valve stem, a locking collar through which the upper end of the valve stem slidably projects, said collar having a side slot, a notch in one wall of the slot defining a shoulder beneath the upper edge of the collar and a shouldered ledge at the upper edge of the collar communicating with the slot, and a lug carried by the valve stem adapted for selective engagement with the shouldered ledge, or side shoulder for holding the valve locked in either closed or open positions.

13. In a pneumatic tire valve, a tensioned valve stem, a valve carried thereby, and stationary means cooperating with said valve stem adapted, when the valve stem is rotated in reverse directions, for holding the valve either locked on its seat or spaced therefrom.

14. In a pneumatic tire valve, a tensioned valve stem, a valve carried thereby, and stationary means cooperating with said valve stem adapted, when the valve stem is rotated in reverse directions, for holding the valve either locked on its seat or spaced therefrom, said means being constructed to cause longitudinal movement of the valve stem when the valve stem is rotated for locking the valve on its seat.

In testimony whereof I affix my signature.

FREDERICK MYERS.